(12) United States Patent
Grüner (10) Patent No.: US 12,516,695 B2
(45) Date of Patent: Jan. 6, 2026

(54) WOBBLE PLATE BEARING ARRANGEMENT AND SURGICAL INSTRUMENT EQUIPPED THEREWITH

(71) Applicant: KARL STORZ SE & Co. KG, Tuttlingen (DE)

(72) Inventor: Sven Axel Grüner, Trossingen (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 161 days.

(21) Appl. No.: 18/436,302

(22) Filed: Feb. 8, 2024

(65) Prior Publication Data

US 2024/0271659 A1    Aug. 15, 2024

(30) Foreign Application Priority Data

Feb. 9, 2023   (DE) ..................... 10 2023 103 174.0

(51) Int. Cl.
| | |
|---|---|
| *F16C 33/38* | (2006.01) |
| *A61B 34/00* | (2016.01) |
| *F16C 23/08* | (2006.01) |
| *F16D 3/223* | (2011.01) |
| *A61B 17/00* | (2006.01) |

(Continued)

(52) U.S. Cl.
CPC ............ *F16C 23/086* (2013.01); *A61B 34/71* (2016.02); *F16C 33/38* (2013.01); *F16D 3/223* (2013.01); *A61B 2017/00323* (2013.01); *A61B 17/2812* (2013.01); *A61M 25/0147* (2013.01); *F16C 2316/10* (2013.01)

(58) Field of Classification Search
CPC ..... A61B 17/2812; A61B 2017/00323; A61M 25/0147; F16C 11/0614; F16C 23/086; F16C 33/38; F16C 2316/10; F16D 3/16; F16D 3/223; F16D 3/2233

See application file for complete search history.

(56) References Cited

U.S. PATENT DOCUMENTS

| | | |
|---|---|---|
| 1,980,846 A | 11/1934 | Bradley |
| 10,105,128 B2 | 10/2018 | Cooper et al. |
| 2009/0209820 A1 | 8/2009 | Tanaka |

(Continued)

FOREIGN PATENT DOCUMENTS

| | | |
|---|---|---|
| DE | 102019121092 A1 | 2/2021 |
| DE | 102021119529 A1 | 2/2023 |

(Continued)

*Primary Examiner* — Phillip A Johnson
(74) *Attorney, Agent, or Firm* — Honigman LLP (57) ABSTRACT

A surgical instrument and a bearing arrangement includes a wobble plate having a main shaft. The wobble plate is rotatable about two axes and to the main axes of the main shaft. An intersection of the two axes defines a pivot center of the wobble plate and is located on the main axis. The main shaft has a spherical coupling portion. The wobble plate includes a hollow spherical outer bearing opening. A bearing arrangement includes rolling bearing balls and a ball cage movably arranged in the outer bearing opening and delimits a hollow spherical inner bearing opening. The ball cage includes window openings in which the rolling bearing balls are arranged. The coupling portion has first round grooves for the rolling bearing balls and the outer bearing opening has second round grooves for the rolling bearing balls.

15 Claims, 5 Drawing Sheets

(51) Int. Cl.
*A61B 17/28* (2006.01)
*A61M 25/01* (2006.01)

(56) References Cited

U.S. PATENT DOCUMENTS

| | | | | |
|---|---|---|---|---|
| 2011/0022078 A1* | 1/2011 | Hinman | ............. | A61B 17/2909 |
| | | | | 403/123 |
| 2012/0265214 A1 | 10/2012 | Bender et al. | | |
| 2021/0038331 A1* | 2/2021 | Grüner | .................. | B25J 9/1035 |
| 2022/0338895 A1* | 10/2022 | Bono | ................. | A61B 17/1631 |

FOREIGN PATENT DOCUMENTS

| | | |
|---|---|---|
| DE | 102021119533 A1 | 2/2023 |
| GB | 978230 A | 12/1964 |

\* cited by examiner

Fig. 9

WOBBLE PLATE BEARING ARRANGEMENT AND SURGICAL INSTRUMENT EQUIPPED THEREWITH

CROSS-REFERENCE TO RELATED APPLICATIONS

This application claims priority of German Patent Application No. 10 2023 103 174.0 filed on Feb. 9, 2023, the contents of which are incorporated herein.

TECHNICAL FIELD

The disclosure relates to a bearing arrangement of a wobble plate having a main shaft of a surgical instrument, and to a surgical instrument comprising such a bearing arrangement.

BACKGROUND

The prior art has disclosed surgical instruments that can be guided manually by means of a handle or by a robot and that have a tool at the distal end of an elongate shaft, it being possible to pivot said tool vis-à-vis the shaft, which defines a main axis, by way of a deflection mechanism made of a plurality of meshing pivot members. These pivot members are connected by way of a multiplicity of steering wires or steering cables in order to attain delicate tool tip control. For actuation purposes, the steering wires may be fastened to a wobble plate which can be spatially aligned by a steering gear and which is pivotable on a main shaft of the surgical instrument about two axes which are orthogonal to one another and to the longitudinal axis of the main shaft which corresponds to the main axis of the surgical instrument.

U.S. Pat. No. 10,105,128 B2 has disclosed the practice of using two parallel rods to actuate a gimbal-mounted wobble plate, which is connected to a deflection mechanism by way of steering wires. To this end, the rods have a ball socket at one end for accommodating a spherical element coupled to the wobble plate. At their other end, these spherical joint rods are connected via rotary joints to a respective gear wheel quadrant, in order to move the spherical joint rods backward and forward linearly for the purpose of aligning the wobble plate. The center of the gimbal mount for tilting the wobble plate is clearly defined here; however, the wobble plate control with spherical joint rods is not particularly direct but afflicted by play and has a disadvantageous power flow. Further, the structure which in this case does not allow a rotation of the wobble plate about the shaft axis requires precisely manufactured components, and these are linked with corresponding costs.

A steering gear having a wobble plate which is able not only to be spatially aligned but also to rotate about the shaft axis is disclosed in DE 10 2019 121 092 A1. For the spatial alignment of the wobble plate, use is made of a differential gear with two opposing input bevel gears and an output bevel gear which meshes with the input bevel gears and is coupled to the wobble plate. To this end, the wobble plate is rotatably mounted in a steering ring which is connected for conjoint rotation to the output bevel gear. In this way, the adjustment angles of the drives are transmitted directly to the wobble plate in order to appropriately align or deflect the tool tip. In this case, the wobble plate is gimbal-connected to a rotatable main shaft by means of a universal joint plate and two orthogonal axis pairs, and can therefore be rotated with the main shaft about the shaft axis.

As a matter of principle, the universal joint has the gimbal error known from the literature: A bent universal joint brings about an uneven rotary transmission. This means that the output shaft does not have a constant rotational speed in the case of a constant rotational speed of the input shaft. This unevenness, also referred to as gimbal error, increases with the bending angle. The transmission of the rotary angle from the shaft axis to the wobble plate thus is nonlinear and has a deviation of approximately #15% when the wobble plate is deflected to 30°, for example. This deviation in the control is transmitted forward and results in an uneven, jerky movement if the instrument is rotated in the articulated state.

The alternative use of a universal joint plate with two pin pairs crossed at right angles for the gimbal mount of a wobble plate on an instrument shaft, in which one pin pair is connected to the shaft and one pin pair is connected to the wobble plate, too, is linked to greater procurement, bearing and assembly costs. Moreover, as a matter of principle, the gimbal mount with a universal joint plate requires a very large installation space in the case of large angle offsets, and this is an obstacle to a miniaturization of the proximal-side drive of the instrument.

SUMMARY

Proceeding from this prior art, it is an object of the present disclosure to provide an improved bearing arrangement of a wobble plate having a main shaft, wherein the wobble plate is connected to the main shaft in an articulated fashion and is rotatable about two axes which are orthogonal to one another and to the main axis.

This object is achieved by a bearing arrangement having the features of claim 1.

The further object of providing a surgical instrument with an improved bearing arrangement is achieved by the surgical instrument having the features of independent claim 14.

Developments or preferred embodiments are explained in the dependent claims.

A first embodiment of the bearing arrangement according to the disclosure relates to the bearing of a spatially alignable wobble plate of a surgical instrument having a main shaft. The wobble plate, which can be connected to a plurality of steering wires for the purpose of controlling a distal deflection mechanism of the surgical instrument, is connected in articulated fashion to the main shaft which defines a main axis. In this case, the wobble plate is rotatable about two axes which are orthogonal to one another and to the main axis, with an intersection of the two axes, which defines a pivot center of the wobble plate, being located on the main axis. According to the disclosure, the main shaft comprises a spherical coupling portion and the wobble plate comprises a hollow spherical outer bearing opening, the pivot center of the wobble plate corresponding to a ball center of the hollow spherical outer bearing opening and, in the bearing arrangement, a ball center of the spherical coupling portion. Further, the bearing arrangement comprises rolling bearing balls with a ball radius and a ball cage which is movably arranged in the outer bearing opening and delimits a hollow spherical inner bearing opening in which the coupling portion of the main shaft is movably arranged. The ball cage has window openings, in each of which one of the rolling bearing balls is arranged. The coupling portion comprises first round grooves, which extend in the longitudinal direction of the main shaft, as inner raceway for the rolling bearing balls, and the outer bearing opening comprises second round grooves, which likewise extend in the longitudinal direction of the main shaft, as outer raceway for the rolling bearing balls.

Since the pivot center of the wobble plate is defined here by the ball center of the hollow spherical outer bearing opening of the wobble plate, and hence also corresponds to the ball centers of the ball cage concentrically arranged therein and of the spherical coupling portion, the bearing arrangement according to the disclosure, which can transfer axial forces on at least one side, does not have a gimbal error unlike the known wobble plate bearing by means of a universal joint.

In the present case, the designation "spherical" or "hollow spherical" also encompasses shapes corresponding to a part of a ball or hollow ball, for example a spherical segment or a spherical disk, which are a part of a ball body which is separated out by the cut with one plane or with two parallel planes.

In this case, a further embodiment of the bearing arrangement according to the disclosure provides for each first round groove to be formed along a first circular arc segment on the coupling portion such that the circle center of the first circular arc segment is coincident with the ball center of the coupling portion, and hence corresponds to the pivot center of the wobble plate. Each second round groove is formed along a second circular arc segment in the outer bearing opening such that the circle center of the second circular arc segment corresponds to the ball center of the outer bearing opening, and hence to the pivot center of the wobble plate.

Thus, the first round grooves extend in the spherically curved surface of the coupling portion, and the second round grooves are formed in the spherically curved surface of the outer bearing opening, opposite to the first round grooves. In this case, the first and the second circular arc segment are located at the respective groove base, with a difference between the radii of the first and the second circular arc segment corresponding to the diameter of the rolling bearing balls. In this case, the first and the second round grooves may each have an inlet and/or outlet portion, which adjoins the groove region extending along the circular arc segment and which may have a radius deviating from the radius of the circular arc segment and/or a deviating direction of curvature.

According to a further embodiment of the bearing arrangement according to the disclosure, the first and the second round grooves each have a pitch circle-shaped profile with a groove cross-sectional radius that corresponds to the ball radius of the rolling bearing balls.

According to a further advantageous embodiment, the bearing arrangement according to the disclosure may also provide for each of the spherical shapes of the coupling portion and ball cage and each of the hollow spherical shapes of the inner and outer bearing opening to correspond to a spherical disk, i.e. a part of a ball cut out by two parallel planes. In this case, the inner bearing opening and the outer bearing opening are each in the form of a passage opening such that the main shaft extends through the wobble plate and the ball cage, is mounted so as to be rotatable about the main axis by means of a respective bearing on both sides of the wobble plate and is secured in the axial direction.

According to an alternative embodiment of the bearing arrangement according to the disclosure, the spherical shapes of the coupling portion and ball cage and the hollow spherical shapes of the inner and outer bearing opening may each correspond to a spherical segment, i.e. a part of a ball separated away by the cut with one plane. In this case, the inner bearing opening and the outer bearing opening are each in the form of an accommodation opening that is closed around the coupling portion on the proximal side, such that the main shaft extends only on the distal side from the wobble plate and the ball cage, is mounted so as to be rotatable about the main axis distally of the wobble plate and is secured in the axial direction.

Moreover, according to a further embodiment of the bearing arrangement according to the disclosure, the coupling portion having the first round grooves, the ball cage having the window openings and having the inner bearing opening, the rolling element balls and the outer bearing opening of the wobble plate having the second round grooves can be dimensioned so as to be matched to one another in such a way that the ball cage forms an inner ball joint with the coupling portion and an outer ball joint, concentric with the inner ball joint, with the outer bearing opening of the wobble plate.

In a development of this embodiment of the bearing arrangement according to the disclosure, a surface of the spherical coupling portion adjacent to the first round grooves and an inner surface of the ball cage adjacent to the window openings can form an inner slide bearing in this case. Additionally, a surface of the hollow spherical accommodation opening adjacent to the second round grooves can form an outer slide bearing with an outer surface of the ball cage adjacent to the window openings. In this case, both concentric ball joints are mounted by means of a slide bearing.

Alternatively, the coupling portion and the outer bearing opening may each comprise a distal and a proximal bearing portion, the first round grooves, the second round grooves and the ball cage, which form the concentric ball joints, being present in the distal bearing portion. In comparison with the previous variant, this allows use of a narrower ball cage and smaller rolling bearing balls with a coupling portion having larger dimensions in the case of an unchanging diameter of the outer bearing opening. In the proximal bearing portion, the surface of the coupling portion comprises an inner slide portion and the surface of the outer bearing opening comprises an outer slide portion which, together with the inner slide portion, forms a slide bearing directly between the coupling portion and the outer bearing opening.

As an alternative to the embodiments in which the bearing arrangement according to the disclosure provides for at least one slide bearing, an efficient rolling bearing can be provided according to a further alternative embodiment of the bearing arrangement according to the disclosure, wherein the bearing arrangement comprises secondary rolling balls which are smaller than the rolling bearing balls and, guided by the ball cage, run on a surface of the coupling portion adjacent to the first round grooves on the inside and on a surface of the outer bearing opening adjacent to the second round grooves on the outside. To this end, the ball cage may naturally comprise corresponding openings for guiding the secondary rolling balls.

Accordingly, the dimensions of the bearing arrangement, i.e. dimensions of the coupling portion, ball cage and outer bearing opening of the wobble plate, are matched to one another depending on the ball radius of the rolling element balls and optionally of the secondary rolling balls, and are designed as a clearance fit or transition fit.

To facilitate the assembly of the bearing arrangement according to the disclosure, a further embodiment provides for the outer bearing opening of the wobble plate to comprise on the distal side a widening portion matched to the ball cage. Accordingly, the inner bearing opening of the ball cage comprises on the distal side an opening portion matched to the coupling portion.

Hence, the ball cage can be accommodated in the outer bearing opening of the wobble plate through the widening portion and the coupling portion can be accommodated in the ball cage through the opening portion. The widening portion of the outer bearing opening is widened in relation to the hollow spherical profile of the outer bearing opening. This means that the widening portion can be cylindrical or can widen in the distal direction, and to this end can have a radius at least corresponding to the outer radius of the ball cage. Accordingly, the distal opening portion of the inner bearing opening of the ball cage can be cylindrical or can widen, and can have a radius at least corresponding to the radius of the coupling portion.

In an alternative to the embodiment with the distal widening and opening portions of the outer and inner bearing openings, the wobble plate and the ball cage according to a further embodiment may each be formed from two or more parts in order to facilitate the assembly, with at least one joining plane of the wobble plate extending through the outer accommodation opening and at least one joining plane of the ball cage extending through the inner accommodation opening.

Further embodiments of a bearing arrangement according to the disclosure may provide for the window openings, the first round grooves and the second round grooves to be uniformly distributed over the circumference, and/or for two of the window openings present opposite one another on the ball cage to be in the form of circular window openings, with each remaining window opening being in the form of a slot.

In this case, the number of rolling bearing balls in each case corresponds to the number of window openings, of first round grooves and of second round grooves. The diameter of the circular window openings is adapted to the diameter of the rolling bearing balls for secure guidance. The longitudinal sides of the slots extend parallel to the opening portion of the ball cage in the circumferential direction, with the width of each slot, i.e. the distance between the longitudinal sides, being adapted to the diameter of the rolling bearing balls.

According to a further embodiment of a bearing arrangement according to the disclosure, the outer bearing opening is formed in a distal bearing portion of the wobble plate. On the proximal side, this distal bearing portion is connected to a spherical drive portion, the ball center of which is spaced apart from the pivot center of the wobble plate. The spherical drive portion can be accommodated in a cylindrical sleeve element which is spatially alignable using a drive apparatus.

The spherical drive portion accommodated in rotatable and displaceable fashion in the sleeve element follows the movement of the sleeve element, whereby the wobble plate is accordingly pivoted in space about its pivot center. A wobble plate axis orthogonal to the wobble plate plane in this case extends through the pivot center and the center of the spherical portion. The wobble plate plane is defined by the points where the steering wires are fastened to the wobble plate. That is to say the center of the spherical portion is located on the main axis in the neutral position of the wobble plate, in which the main axis is orthogonal to the wobble plate plane, as a result of which the wobble plane axis in the neutral position of the wobble plate corresponds to the main axis. A proximal opening portion extending from the outer bearing opening through the spherical drive portion widens in the proximal direction in this case in order to permit pivoting of the wobble plate in the case of a continuous main shaft. In this case, the opening angle of the proximal opening portion depends on the length of the spherical drive portion along the wobble plate axis and on a desired pivot angle of the wobble plate.

According to a first embodiment, a surgical instrument according to the disclosure comprises a shaft, a tool at a distal shaft end and a handle at a proximal shaft end. The handle comprises a bearing arrangement having a wobble plate connected in articulated fashion to a main shaft which defines a main axis. In this case, the wobble plate is pivotable in two directions orthogonal to the main axis about a pivot center located on the main axis. Further, the wobble plate is connected to a plurality of steering wires which extend through the shaft along the main axis to a deflection mechanism of the tool. According to the disclosure, the bearing arrangement of the wobble plate on the main shaft is a bearing arrangement according to the disclosure.

According to a further embodiment of the surgical instrument according to the disclosure, in which the wobble plate comprises on the proximal side a spherical drive portion, the ball center of which is spaced apart from the pivot center of the wobble plate, the handle of the surgical instrument comprises a drive apparatus for spatially aligning a cylindrical sleeve element in which the spherical drive portion of the wobble plate is movably accommodated. In this way, the wobble plate can be pivoted by the spatially alignable sleeve element by way of the spherical drive portion, and hence the tool at the distal shaft end can be deflected accordingly by way of the deflection mechanism.

Further embodiments, and some of the advantages associated with these and with further embodiments, are made clear and more understandable by the following detailed description which makes reference to the attached figures. Objects or parts thereof which are substantially the same or similar may be provided with the same reference signs. The figures are merely a schematic illustration of an embodiment of the disclosure. The drawings, the description, and the claims contain numerous features in combination. It will be appreciated that the features mentioned above and the features yet to be explained below can be applied not only in the respectively specified combination but also in other combinations or on their own, without departing from the scope of the present disclosure.

DETAILED DESCRIPTION OF PREFERRED EMBODIMENTS

Figure 1:
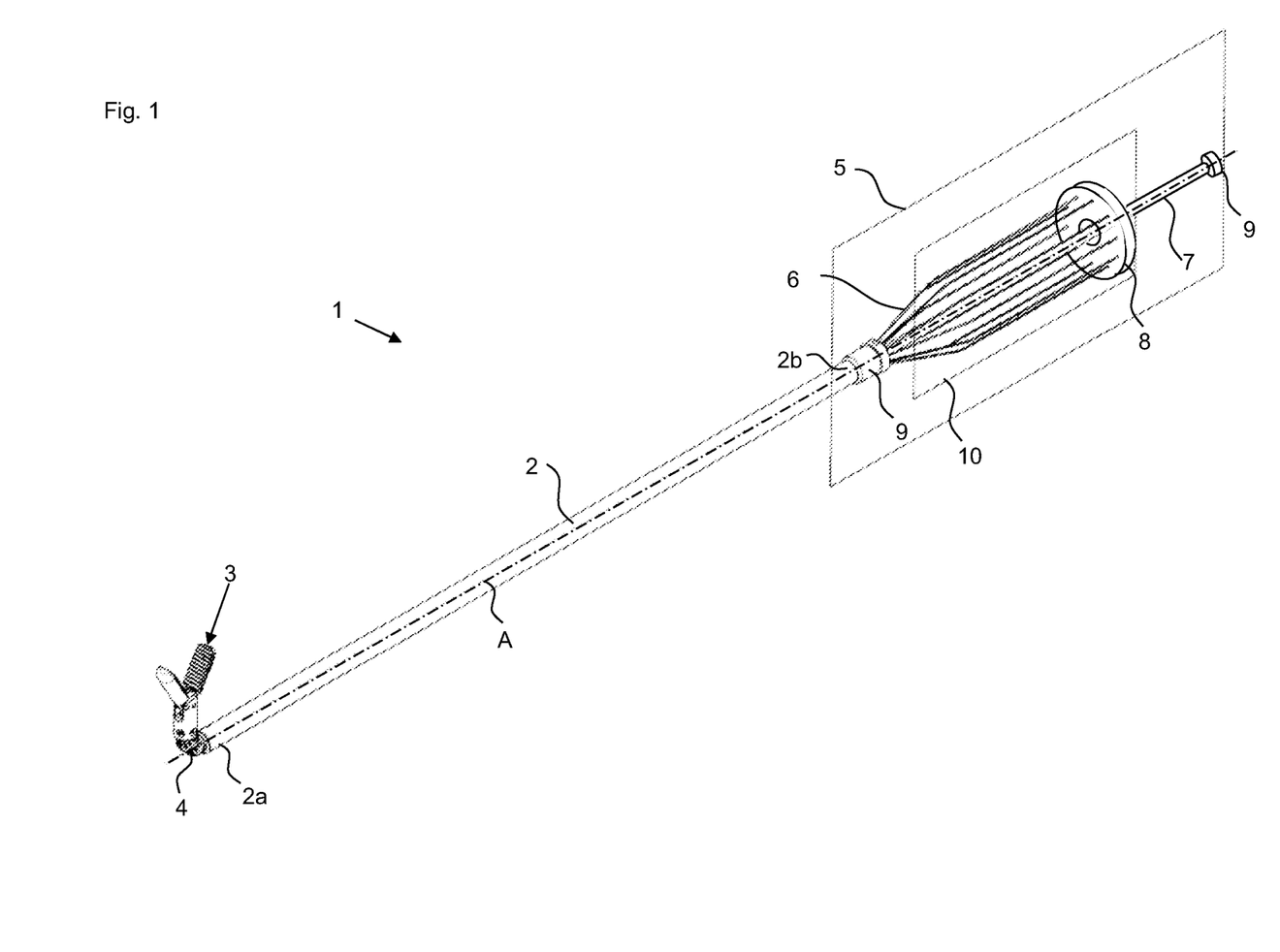
FIG. 1 shows a perspective view of a surgical instrument according to the disclosure with a schematically depicted handle and bearing arrangement.

FIG. 1 shows a surgical instrument 1 with a hollow shaft 2, wherein a handle 5 arranged at the proximal end 2b of the shaft 2 is only depicted schematically. A tool 3 is arranged at the distal end 2a of the shaft 2 and can be, for example, a tool 3 provided with jaw parts, as depicted in FIG. 1, or else an endoscope, an applicator or the like. As evident from FIG. 1, the tool 3 of the surgical instrument 1 is pivotable relative to the main axis A of the shaft 2 by way of a deflection mechanism 4 at the distal shaft end 2a. The deflection mechanism 4 consists of pivot members which are connected to the wobble plate 8 of the bearing arrangement 10 in the handle 5 at the proximal end 2b of the shaft 2 by way of steering wires 6 which extend through the shaft 2. In the bearing arrangement 10, an example of which is depicted in FIGS. 2 to 9, the wobble plate 8 is connected to the main shaft 7 in articulated fashion and is rotatable about two axes X, Y which are orthogonal to one another and to the main axis A. In this case, the main shaft 7 extends through the wobble plate 8, is mounted so as to be rotatable about the main axis A by means of a respective bearing 9 on both sides of the wobble plate 8 and is secured in the axial direction. The distal end 7.4 of the main shaft 7 is connected to the proximal end 2b of the shaft 2 and comprises longitudinal slots, through which the steering wires 6 are guided from the interior of the shaft 2 to the outside, for the purpose of being fastened to the wobble plate 8.

An axially displaceable actuation element (not depicted here) operatively connected on the proximal side to an actuation unit of the handle 5 may extend through the shaft 2 and the main shaft 7 connected therewith, for the purpose of actuating the tool 3, for example for opening and closing the jaw parts. To this end, the main shaft 7 has an axial drilled hole 7.5 coaxial with the main axis A. For example, the actuation element can be in the form of a pull/push rod which can be moved back and forth for the purpose of actuating the tool 3.

A movement of the wobble plate 8 connected to the main shaft 7 in articulated fashion brings about, by way of the steering wires 6, a corresponding relative movement of the distal pivot members of the deflection mechanism 4, and hence a pivoting of the tool 3. Even though use is made of the term steering wires 6 in the present case, from a functional point of view use can also be made of steering cables, which is why the used term steering wires 6 should also be read and understood synonymously as steering cables.

In the case of the bearing arrangement 10 depicted in FIGS. 2 to 9, the wobble plate 8 is connected to the main shaft 7 in articulated fashion and is rotatable about two axes X, Y which are orthogonal to one another and to the main axis A. An intersection of the two axes X, Y which defines a pivot center C of the wobble plate 8 is located on the main axis A. The main shaft 7 comprises a spherical coupling portion 7.1, and a hollow spherical outer bearing opening 8.1, in which the spherical coupling portion 7.1 is arranged, is formed in the wobble plate 8. First round grooves 7.2 are introduced into the spherical coupling portion 7.1 and second round grooves 8.2 are introduced into the outer bearing opening 8.1, the first and second round grooves running in the spherically curved surfaces of the coupling portion 7.1 and of the outer bearing opening 8.1, respectively, in the longitudinal direction of the main shaft 7. Each first round groove 7.2 forms an inner raceway and each second round groove 8.2 forms an outer raceway for a respective rolling bearing ball 12, wherein the pitch circle-shaped profiles of the first round grooves 7.2 and of the second round grooves 8.2 have a groove cross-sectional radius R' that, with an appropriate tolerance, corresponds to the ball radius R of the rolling bearing balls 12, as evident from FIG. 7.

The bearing arrangement 10 also comprises a ball cage 11, arranged in the outer bearing opening 8.1, for guiding the rolling bearing balls 12. The ball cage 11 delimits a hollow spherical inner bearing opening 11.3 in which the coupling portion 7.1 of the main shaft 7 is arranged. In this case, the ball cage 11 comprises window openings 11.1, 11.2 distributed over the circumference, the number of which corresponds to the number of first and second round grooves 7.2, 8.2, and so a respective rolling element ball 12 is arranged in each window opening 11.1, 11.2. Unlike the previous bearing of the wobble plate by means of a universal joint, the bearing arrangement 10, which can also transfer axial forces, does not have a gimbal error.

The first round grooves 7.2 of the spherical coupling portion 7.1 are formed along a first circular arc segment b1. The circle center of each first circular arc segment b1 is coincident with the ball center of the spherical coupling portion 7.1 which corresponds in the bearing arrangement 10 to the pivot center C of the wobble plate 8. It is evident from FIGS. 6 and 7 that the circular arc segment b1 of the first round groove 7.2 is located at the groove base. The center angle α1 of the circular arc segment b1 with the circular arc radius r1 is spanned by the paths connecting the circle or ball center, corresponding to the pivot center C, to the ends of the circular arc segment b1. In this case, the circular arc radius r1 is less than the radius r0 of the coupling portion 7.1 but greater than the shaft radius rw of the main shaft 7. An inlet or outlet portion a1 in each case adjoins the circular arc segment b1 of the first round grooves 7.2. In the depicted example, these inlet or outlet portions have a direction of curvature that deviates from the convex curvature of the circular arc segment b1, with the radius of curvature of the concavely curved inlet or outlet portion a1 approximately corresponding to the circular arc radius r1.

Figure 9:
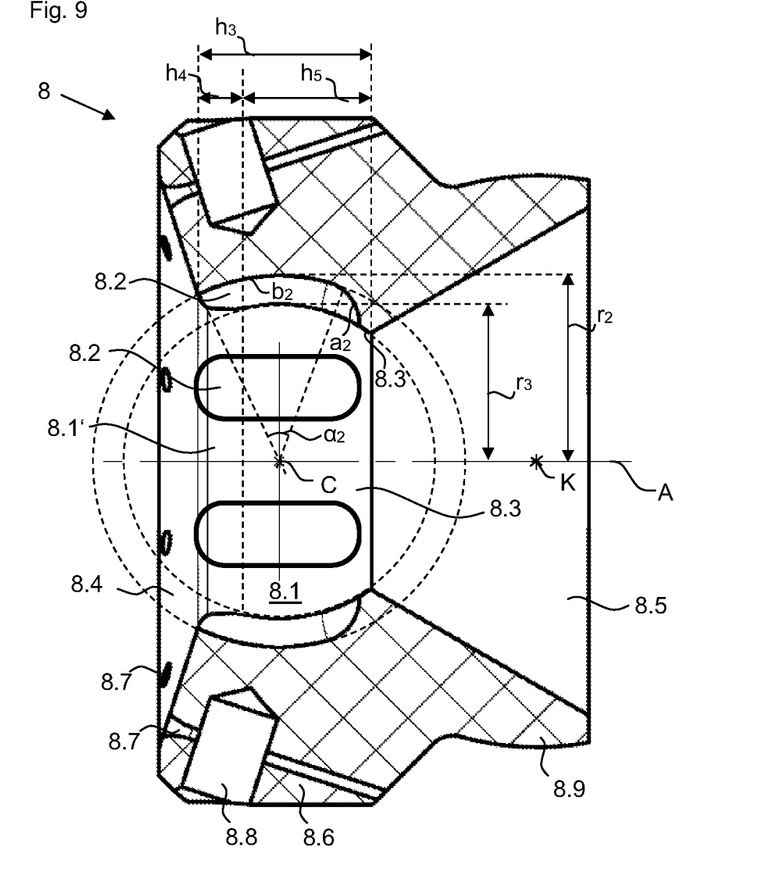
FIG. 9 shows a longitudinal sectional view of the wobble plate.

FIG. 9 shows the wobble plate 8, in which the second round grooves 8.2 of the hollow spherical outer bearing opening 8.1 is formed along a second circular arc segment b2. The circle center of each second circular arc segment b2 is coincident with the hollow ball center of the hollow spherical outer bearing opening 8.1 which corresponds to the pivot center C of the wobble plate 8. The circular arc segment b2 with the circular arc radius r2 is located at the groove base of the second round groove 8.2, wherein the center angle α2 is spanned by the paths connecting the ends of the circular arc segment b2 to the pivot center C. The circular arc radius r2 is greater than the radius r3 of the outer bearing opening 8.1. The proximal end of the circular arc segment b2 is adjoined by an inlet or outlet portion a2 of the second round groove 8.2. In the depicted example, this inlet or outlet portion has the same direction of curvature as the circular arc segment b2 but a deviating radius of curvature which is significantly smaller than the circular arc radius r2 and which corresponds approximately to a third of the circular arc radius r2. On the distal side, the second round groove 8.2 ends at a distal opening portion 8.4 of the wobble plate 8, which conically widens in the distal direction.

The circular arc radius r1 of the first round grooves 7.2 and the circular arc radius r2 of the second round grooves 8.2 are chosen such that the difference between the circular arc radius r2 of the second round grooves 8.2 and the circular arc radius r1 of the first round grooves 7.2 corresponds, with appropriate tolerances, to the ball radius R of the rolling bearing balls 12.

Figure 8:
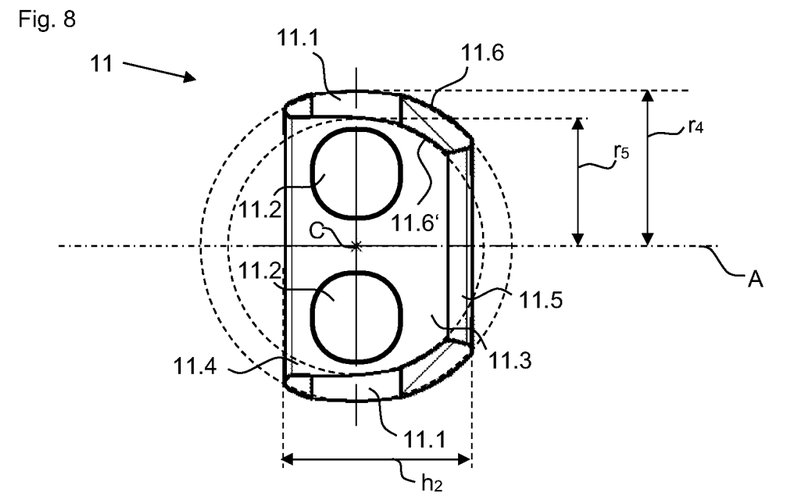
FIG. 8 shows a longitudinal sectional view of the ball cage.

The ball cage 11 depicted in FIG. 8 has an outer radius r4 on the spherical outer surface 11.6 which is matched to the radius r3 of the outer bearing opening 8.1 in order to form a slide bearing. The inner bearing opening 11.3 delimited by the ball cage 11 is formed with the inner radius r5 for accommodating the spherical coupling portion 7.1 by way of a slide bearing, with the result that the inner radius r5 of the ball cage 11 corresponds, with the appropriate tolerances, to the radius r0 of the coupling portion 7.1. Hence the surface 7.3 of the spherical coupling portion 7.1 adjacent to the first round grooves 7.2 forms an inner slide bearing with the inner surface 11.6' of the ball cage 11 adjacent to the window openings 11.1, 11.2. The surface 8.3 of the hollow spherical bearing opening 8.1 adjacent to the second round grooves 8.2 forms an outer slide bearing with the outer surface 11.6 of the ball cage 11 adjacent to the window openings 11.1, 11.2. To prevent excessive frictional forces arising here in the case of tilting under load, the ball cage 11 may be manufactured from a material which forms a low-friction material pairing with the materials of the spherical portion 7.1 and of the outer bearing opening 8.1. Examples of suitable materials for the ball cage comprise brass. Teflon, or self-lubricating performance polymers, etc. Alternatively, the ball cage 11 may comprise an appropriate coating on the outer and/or inner surface 11.6, 11.6' in order to provide a low-friction material pairing with the materials of the spherical portion 7.1 and of the outer bearing opening 8.1. Depending on the material of the spherical portion 7.1 or of the outer bearing opening 8.1, the outer and inner surface 11.6, 11.6' of the ball cage 11 may optionally comprise different materials/coatings in order to form a low-friction material pairing in each case.

In any case, the ball cage 11 forms an inner ball joint with the coupling portion 7.1 and an outer ball joint, concentric with the inner ball joint, with the outer bearing opening 8.1 of the wobble plate 8. In this case, the rolling bearing balls 12 are guided by the ball cage 11 along the circular arc segments b1, b2 in the respective round grooves 7.2, 8.2.

The window openings 11.1, 11.2 are distributed uniformly along the circumference of the ball cage 11. In this case, the window openings 11.1, 11.2 are located along an equatorial plane of the ball cage 11 which, in the neutral position as depicted in FIG. 8, extends through the ball center of the ball cage 11 in a manner orthogonal to the main axis A. The circumferential arrangement of the window openings 11.1, 11.2 thus corresponds to the circumferential arrangement of the first round grooves 7.2 on the coupling portion 7.1 and to the circumferential arrangement of the second round grooves 8.2 in the outer bearing opening 8.1.

Figure 2:
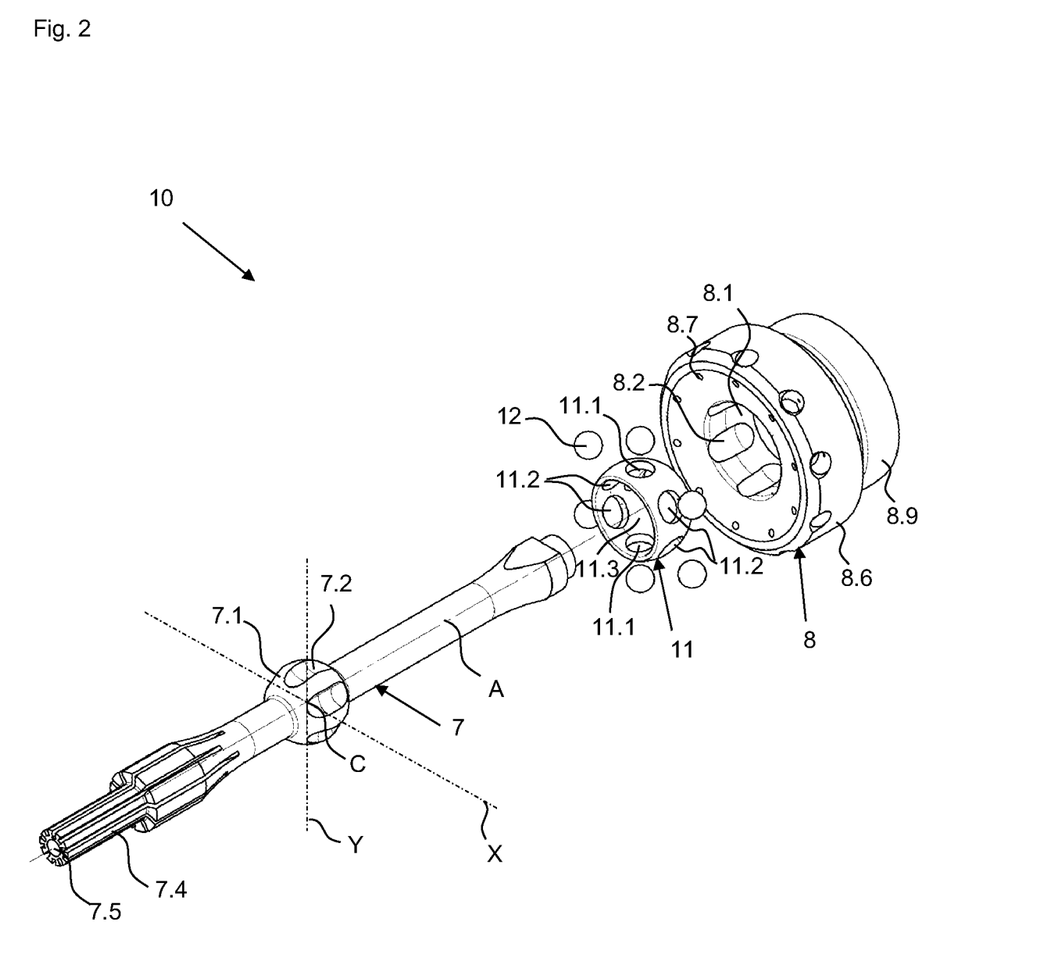
FIG. 2 shows an exploded perspective view of a bearing arrangement according to the disclosure.
Figure 3:
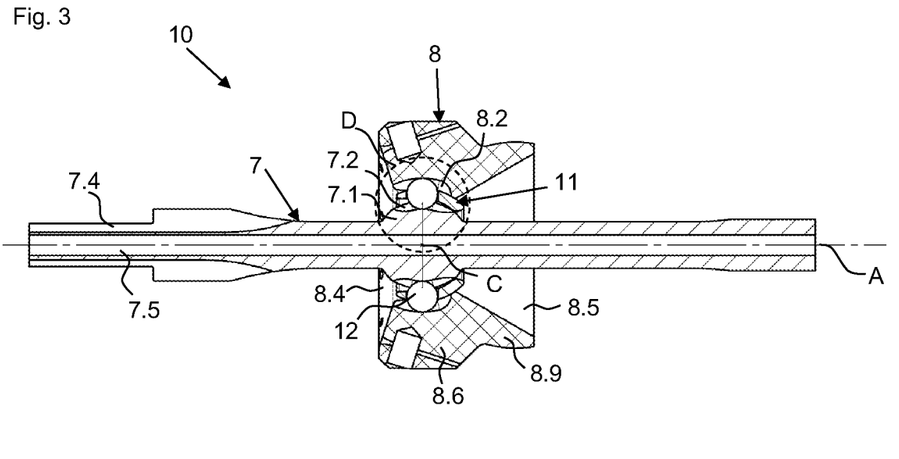
FIG. 3 shows a longitudinal sectional view through the bearing arrangement according to the disclosure of FIG. 2, with the wobble plate in a neutral position.
Figure 4:
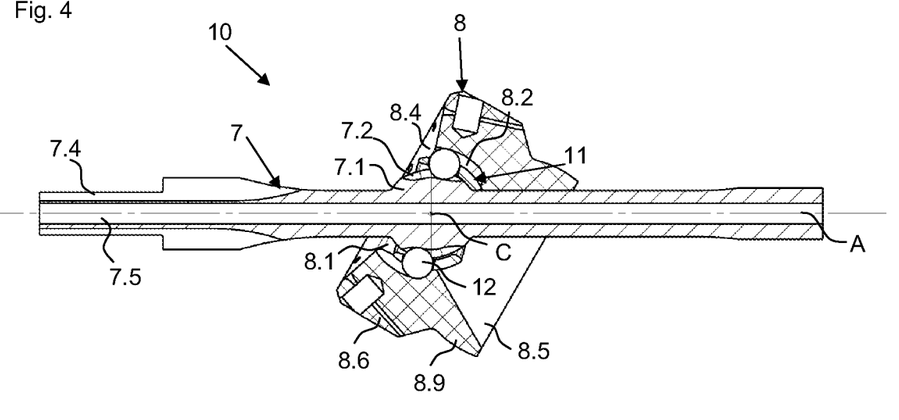
FIG. 4 shows a longitudinal sectional view through the bearing arrangement according to the disclosure of FIG. 2, with the wobble plate in a position pivoted about the X-axis.
Figure 5:
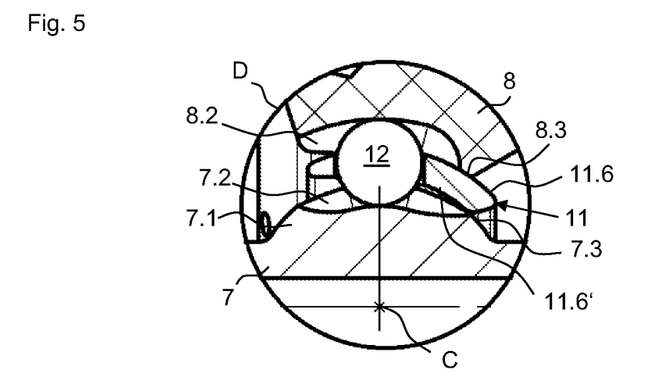
FIG. 5 shows a detailed view from FIG. 3.
Figure 6:
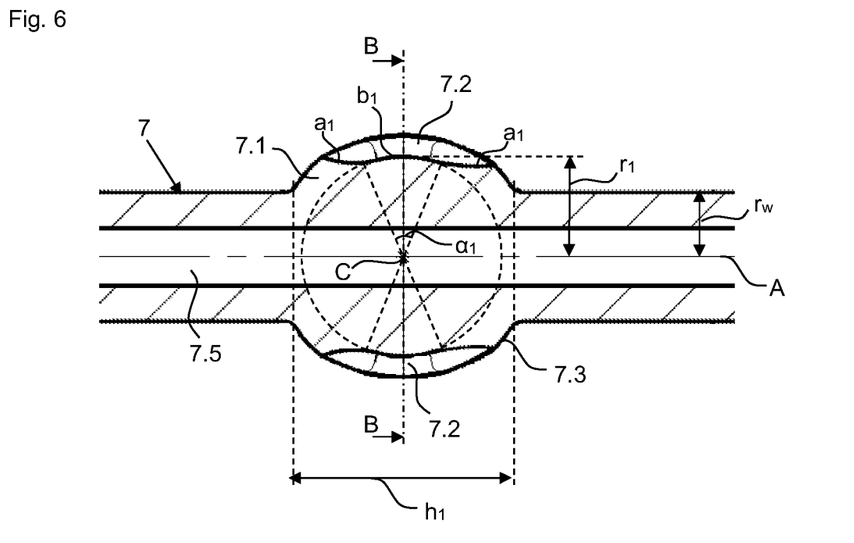
FIG. 6 shows a detailed longitudinal sectional view of the coupling portion of the main shaft.
Figure 7:
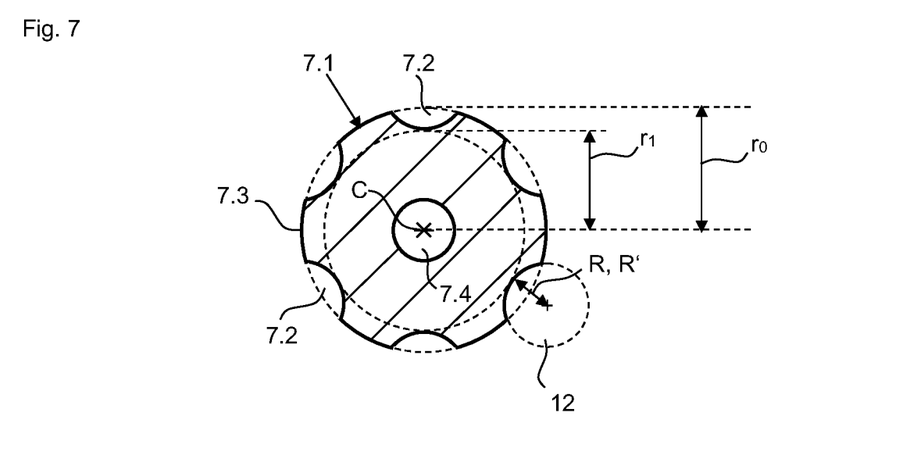
FIG. 7 shows a cross-sectional view through the coupling portion of the main shaft along the cut line BB in FIG. 6.

It is also evident from FIG. 2 that two opposing window openings 11, 1 are circular, and so these can be formed by simple drilling, while the remaining window openings 11.2 are in the form of slots since the distances between the rolling bearing balls 12 along their path in the round grooves 7.2, 8.2 change slightly when the wobble plate 8 is tilted. In the circumferential direction, the longitudinal sides of the window opening 11.2 designed as a slot run parallel to the equatorial plane. The width or distance between the longitudinal sides of the window opening 11.2 designed as a slot is dimensioned like the diameter of the two circular window openings 11.2 for accommodating the rolling bearing balls 12, with the length of the slots 11.2 being depicted in exaggerated fashion in FIGS. 2 and 8 for illustrative purposes. Each window axis which runs in the radial direction through a (window) center and the ball center of the ball cage 11, corresponding in the bearing arrangement 10 to the pivot center C, is located in the equatorial plane of the ball cage 11 in this case.

As is evident from FIGS. 2 to 9, the (hollow) spherical shapes of the coupling portion 7.1, ball cage 11 and outer bearing opening 8.1 each correspond to a (hollow) spherical disk, i.e. to a part of a ball which is cut out by two parallel planes, which extend orthogonal to the main axis A in the case of the main shaft 7. The spherical disk shape arises from the fact that the shaft portions of the main shaft 7 adjoin on both sides of the spherical coupling portion 7.1, with the result that the main shaft 7 easily can be rotatably mounted in the housing of the handle 5 on both sides of the wobble plate 8 and can be axially secured. Accordingly, the ball cage 11 also has a spherical disk shape, and the outer bearing opening 8.1 in the wobble plate 8 and the inner bearing opening 11.3 of the spherical cage 11 are designed in a hollow spherical disk shape and as passage openings.

As evident from FIG. 8, the inner bearing opening 11.3 of the ball cage 11 is connected to a distal opening portion 11.4 and a proximal opening portion 11.5. The cross section of the distal opening portion 11.4 is widened in relation to the hollow spherical shape of the inner bearing opening 11.3 and shaped cylindrically in this case in order to permit the assembly of the ball cage 11 on the coupling portion 7.1. Therefore, the cross-sectional radius of the distal opening portion 11.4 in this example corresponds to the inner radius r5 of the hollow ball cage 11, which is dimensioned for movable accommodation of the coupling portion 7.1 and therefore corresponds to, or is slightly larger than, the radius r0 of the coupling portion 7.1. The cross-sectional radius of the proximal opening portion 11.5 is slightly smaller than the circular arc radius r1 in the example shown, but also depends on a maximum tilt angle envisaged for the wobble plate 8, at which, as evident from FIG. 4, the ball cage 11 and the wobble plate 8 abut against the proximal shaft portion of the main shaft 7.

Similarly, the outer bearing opening 8.1 is in the form of a passage opening, wherein the wobble plate 8 of the depicted example comprises, in addition to a distal bearing portion 8.6 in which the hollow spherical outer bearing opening 8.1 is formed, a spherical drive portion 8.9 for coupling with a drive apparatus. The hollow spherical outer bearing opening 8.1 is located between a distal opening portion 8.4 and a proximal opening portion 8.5 which extends through the spherical drive portion 8.9 and which widens in the proximal direction (see FIG. 9).

At a transition to the distal opening portion 8.4, the outer bearing opening 8.1 comprises a distal widening portion 8.1', the opening cross section of which in relation to the hollow spherical disk shape of the outer bearing opening 8.1 with the radius r3 is widened in order to permit the assembly on the ball cage 11, which is arranged on the coupling portion 7.1 of the main shaft 7. The distal widening portion 8.1' is considered to be part of the hollow spherical outer bearing opening 8.1 since the second round grooves 8.2 extend not only through the hollow spherical part of the outer bearing opening 8.1 but also through the distal widening portion 8.1'.

The length h1 of the spherical disk-shaped coupling portion 7.1 (FIG. 6) in the direction of the main axis A corresponds to the spacing of the two parallel planes orthogonal to the main axis A at the transitions to the shaft portions of the main shaft 7. Presently, the two cut planes are equidistant from an equatorial plane of the coupling portion 7.1 which extends orthogonally to the main axis A through the center of the spherical coupling portion 7.1 which, in the bearing arrangement 10, corresponds to the pivot center C of the wobble plate 8. In the neutral position of the ball cage 11, in which the equatorial plane is orthogonal to the main axis A, the length h2 of the ball cage 11 (FIG. 8) in the direction of the main axis A corresponds to the spacing of the parallel planes which delimit the distal and the proximal opening portion 11.4, 11.5 to the outside and determine the spherical disk shape of the ball cage 11. The length h3 of the outer bearing opening 8.1 (FIG. 9), measured in the direction of the main axis A in the neutral position of the wobble plate 8, is composed of the length h4 of the widening portion 8.1' and the length h5 of the hollow spherical disk-shaped portion (without label) of the outer bearing opening 8.1.

Unlike the spherical disk-shaped coupling portion 7.1, the (hollow) spherical disk shapes of the ball cage 11 and outer bearing opening 8.1 in the depicted example are not symmetrical with respect to the respective equatorial plane running through the center of the respective (hollow) ball shape, which corresponds to the pivot center C of the wobble plate 8 in the bearing arrangement 10, on account of the distal opening portion and widening portion 11.4, 8.1', respectively. As evident from FIG. 5, the lengths h1, h2, h3 of the coupling portion 7.1, of the ball cage 11 and of the outer bearing opening 8.1 therefore differ from one another in the direction of the main axis A in this exemplary embodiment.

In other bearing arrangements not depicted here, which e.g. provide multi-part wobble plates and ball cages or a modified slide or rolling bearing concept, the dimensions (lengths h1 to h5 and radii r0, r3, 14, r5 of coupling portion 7.1, ball cage 11 and outer bearing opening 8.1, rolling bearing ball radius R and also circular arc segments b1, b2 and circular arc radii r1, r2 of the round grooves 7.2, 8.2, etc.) may deviate from the depicted example, for as long as the ball center of the respective (hollow) spherical disk shape in the bearing arrangement 10 corresponds to the pivot center C of the wobble plate 8.

In the neutral position, the wobble plate 8 or the equatorial plane of the outer bearing opening 8.1 or a wobble plate plane defined e.g. by the positions where the steering wires 6 are fastened to the wobble plate 8 is orthogonal to the main axis A. For the purpose of fastening the steering wires 6, the wobble plate 8 of the example depicted in FIG. 9 comprises steering wire drilled holes 8.7 in the bearing portion 8.6, said steering wire drilled holes extending from openings in the distal side of the wobble plate 8 through the bearing portion 8.6. Moreover, a respective fastening drilled hole 8.8 extends from the circumference of the wobble plate 8 to each steering wire drilled hole 8.7 in a manner orthogonal thereto, in order to fasten a steering wire 6 extending through the steering wire drilled hole 8.7 by means of e.g. a set screw. Naturally, the steering wires 6 may also be fastened to the wobble plate in a manner deviating therefrom.

To assemble the bearing arrangement 10, the ball cage 11 is inserted through the distal widening portion 8.1' into the outer bearing arrangement 8.1 of the wobble plate 8, and the rolling bearing balls 12 are inserted into the window openings 11.1, 11.2 and the second round grooves 8.2 from the inside. The outer ball joint obtained thus is pushed onto the main shaft 7 from the proximal side until the spherical portion 7.1 is accommodated by the distal opening portion 11.4 in the ball cage 11, in order to form the inner ball joint. The ball cage 11 thus forms an intermediate plane in the ball joint between main shaft 7 and wobble plate 8 and ensures the one-sided axial securement thereof to one another. The tensile forces, acting in the distal direction, of the steering wires 6 fastened to the wobble plate 8 can thus be diverted into the main shaft 7.

In any case, the position of the pivot center C of the wobble plate 8 is uniquely defined on the main axis A by means of the bearing arrangement 10. Pivoting of the wobble plate 8 is brought about by moving the spherical drive portion 8.9, the ball center K of which is spaced apart from the pivot center C of the wobble plate 8, as evident from FIG. 9. Each movement of the spherical drive portion 8.9 upwardly, downwardly and forward or backward (in relation to the plane of the drawing) directly brings about a pivoting of the wobble plate 8 about its pivot center C. In the process, the ball center K moves on a spherical trajectory in space on account of the fixed distance from the pivot center C of the wobble plate 8 and can therefore not be actuated directly by a Cartesian drive.

Therefore, in the handle 5, the surgical instrument 1 comprises a drive apparatus and, connected therewith, a spatially alignable cylindrical sleeve element (not depicted here), in the cylindrical receptacle of which the spherical drive portion 8.9 is movably accommodated. In this case, a fit between the inner diameter of the sleeve element and the outer diameter of the spherical drive portion 8.9 is chosen in a manner dependent on the application and the respective material pairing such that the spherical drive portion 8.9 can both rotate and/or tilt within the sleeve element and move along the sleeve axis in the sleeve element.

Depending on the type of drive apparatus, the sleeve element can be moved in two spatial directions X, Y in a plane orthogonal to the main axis A by means of a drive apparatus (not depicted here) with a Cartesian driving mechanism. In this case, the sleeve axis always remains parallel to the main axis A. Drive apparatuses with Cartesian driving mechanisms with two one-axis linear guide apparatuses preferably arranged orthogonal to one another are known. For example, these also include cross or coordinate tables.

A parallel kinematic articulated arm chain is advantageous as drive apparatus, which moves the sleeve element in a plane perpendicular to the main axis A in order to pivot the wobble plate 8 about its center C and over the spherical drive portion 8.9. To this end, a parallel kinematic articulated arm chain comprises four arm segments which are interconnected in articulated fashion in a closed chain by way of a housing component. The drive apparatus comprises two motors which are arranged axially parallel to the main axis A, wherein a respective first arm segment is fastened to each motor shaft, the first arm segment in each case being pivotably connected to a second arm segment. The two second arm segments are rotatably mounted on the sleeve element in each case, with a central joint being formed, and hence also mounted so as be rotatable to one another, by means of a rolling bearing. In this case, the sleeve element acts as the joint pin of the central joint.

Since the sleeve element and the spherical drive portion 8.9 can be oriented as desired with respect to one another—within certain limits—without the risk of jammed or blocked components, the sleeve element can be displaced along or parallel to the main axis A or tilted in relation to the main axis A in moderation, with the result that the sleeve axis is not parallel to the main axis A but runs at an angle thereto. Therefore, other drive apparatuses can also be used to move the sleeve element as an alternative to the Cartesian driving mechanism, for example a drive apparatus having a differential gear, which rotates the sleeve element about a (virtual) pivot center which may be offset from the pivot center C of the wobble plate 8. In this case, coupling the spherical drive portion 8.9 to the sleeve element enables a movement without blockages, and all angles can be reached without problems. In the case of a differential gear as drive apparatus comprising two opposing input bevel gears and an output bevel gear meshing with the two input bevel gears, the output bevel gear is connected for conjoint rotation to a steering ring in which the spherical drive portion 8.9 of the wobble plate 8 is mounted by way of a rolling bearing such that the wobble plate 8 is rotatable vis-à-vis the steering ring for the purpose of rotation with the main shaft 7. The sleeve element in which the spherical drive portion 8.9 is accommodated is provided here by the inner race of the rolling bearing which is pivotable with the steering ring about the pivot center of the differential gear.

Modifications and further embodiments of the bearing arrangement according to the disclosure, which are not depicted here, refer to the fact that—as an alternative to the embodiment with the distal widening and opening portions 8.1', 11.4 of the wobble plate 8 and of the ball cage 11, respectively, with are widened in relation to the ball shape—the wobble plate 8 and the ball cage 11 can each be in the form of two or more parts in order to enable the assembly of the bearing arrangement 10. To this end, at least one joining plane in each case runs through the outer accommodation opening 8.1 of the wobble plate 8 and the inner accommodation opening 11.3 of the ball cage 11. For example, a joining plane may run along the respective equatorial plane or orthogonal thereto. In such a bearing arrangement forces can be transferred in both axial directions, in contrast to the variant with the widened distal widening and opening portions 8.1', 11.4, whereby forces can only be transferred in the axial direction on one side.

Further, unlike what is depicted, it is possible that the main shaft does not extend through the wobble plate but ends in the spherical coupling portion, the latter then accordingly being in the form of a spherical segment which is delimited from the shaft portion of the main shaft by a cut plane orthogonal to the main axis. In such an embodiment, the main shaft is rotatably mounted on the distal side with respect to the wobble plate, preferably by means of two bearings in the housing of the handle, and likewise secured axially. In a manner corresponding to such a coupling portion, the ball cage and the outer bearing opening are also in the form of a (hollow) spherical segment such that the inner and the outer bearing opening are each in the form of an accommodation opening that is closed on the proximal side. The surfaces available for the slide bearing between coupling portion, ball cage and outer bearing opening would be larger and hence more advantageous. In an alternative or in addition, the larger contact surfaces can be used to introduce additional rolling balls in order to obtain a more efficient rolling bearing.

A further alternative according to the disclosure to the example illustrated may provide for the ball cage to have a narrower design and for smaller rolling bearing balls to be used in round grooves along a circular arc segment with a relatively larger circular arc radius by virtue of the coupling portion and the outer bearing opening each being subdivided into a distal and a proximal bearing portion. The first and second round grooves and the ball cage are then arranged in the distal bearing portion, while the surface of the coupling portion forms a slide bearing directly with the surface on the outer bearing opening in the proximal bearing portion.

Further, a bearing arrangement according to the disclosure can be formed as a pure rolling bearing, for the purpose of which the bearing arrangement comprises secondary rolling balls which are smaller than the rolling bearing balls running in the first and second round grooves, with the result that the secondary rolling balls, in a manner guided by the ball cage, run on the surface of the coupling portion adjacent to the first round grooves on the inside and on a surface on the outer bearing opening adjacent to the second round grooves on the outside.

The drawings, the description, and the claims contain numerous features in combination. It will be appreciated that the aforementioned features are applicable not only in the respectively specified combination but also in other combinations or on their own, without departing from the scope of the present disclosure. The present disclosure provides a surgical instrument 1 and a bearing arrangement 10 comprising a wobble plate 8 having a main shaft 7. The wobble plate 8 is connectable to a plurality of steering wires 6 and is connected in articulated fashion to the main shaft 7 which defines a main axis A. The wobble plate 8 is rotatable about two axes X, Y which are orthogonal to one another and to the main axis A. An intersection of the two axes X, Y defines a pivot center C of the wobble plate 8 and is located on the main axis A. The main shaft 7 has a spherical coupling portion 7.1 and the wobble plate 8 comprises a hollow spherical outer bearing opening 8.1, the pivot center C of the wobble plate 8 corresponding to a ball center of the outer bearing opening 8.1 and, in the bearing arrangement 10, a ball center of the spherical coupling portion 7.1. Further, the bearing arrangement 10 comprises rolling bearing balls 12 with a ball radius R and a ball cage 11 which is movably arranged in the outer bearing opening 8.1 and delimits a hollow spherical inner bearing opening 11.3 in which the coupling portion 7.1 of the main shaft 7 is movably arranged. In this case, the ball cage 11 comprises window openings 11.1, 11.2, in each of which one of the rolling bearing balls 12 is arranged. The coupling portion 7.1 has first round grooves 7.2 in the longitudinal direction of the main shaft 7 as inner raceway for the rolling bearing balls 12 and the outer bearing opening 8.1 has second round grooves 8.2 in the longitudinal direction of the main shaft 7 as outer raceway for the rolling bearing balls 12.

The invention claimed is:

1. A bearing arrangement of a spatially alignable wobble plate of a surgical instrument having a main shaft, the wobble plate being connectable to a plurality of steering wires for the purpose of controlling a distal deflection mechanism of the surgical instrument and being connected in articulated fashion to the main shaft which defines a main axis, the wobble plate being rotatable about two axes which are orthogonal to one another and to the main axis, and an intersection of the two axes defining a pivot center of the wobble plate being located on the main axis, wherein the main shaft comprises a spherical coupling portion and the wobble plate comprises a hollow spherical outer bearing opening, the pivot center of the wobble plate corresponding to a ball center of the hollow spherical outer bearing opening and, in the bearing arrangement, a ball center of the spherical coupling portion, and the bearing arrangement comprises:
  a plurality of rolling bearing balls with a ball radius; and
  a ball cage which is movably arranged in the outer bearing opening and delimits a hollow spherical inner bearing opening in which the coupling portion of the main shaft is movably arranged, with
  the ball cage including window openings, in each of which one of the rolling bearing balls is arranged, and
  the coupling portion includes first round grooves in the longitudinal direction of the main shaft as an inner raceway for the rolling bearing balls and the outer bearing opening comprising second round grooves in the longitudinal direction of the main shaft as an outer raceway for the rolling bearing balls.

2. The bearing arrangement as set forth in claim 1, wherein
each first round groove is formed along a first circular arc segment, the circle center of which is coincident with the ball center of the spherical coupling portion, and
each second round groove is formed along a second circular arc segment, the circle center of which corresponds to the pivot center of the wobble plate.

3. The bearing arrangement as set forth in claim 1, wherein
the first round grooves and the second round grooves each have a pitch circle-shaped profile with a groove cross-sectional radius that corresponds to the ball radius of the rolling bearing balls.

4. The bearing arrangement as set forth in claim 1, wherein
a spherical shape of the coupling portion, a spherical shape of the ball cage, a hollow spherical shape of the inner bearing opening and a hollow spherical shape of the outer bearing opening each correspond to a spherical disk, with the inner bearing opening and the outer bearing opening each being in the form of a passage opening such that the main shaft extends through the wobble plate and the ball cage, is mounted so as to be rotatable about the main axis by means of a respective bearing on both sides of the wobble plate and is secured in the axial direction.

5. The bearing arrangement as set forth in claim 1, wherein
a spherical shape of the coupling portion, a spherical shape of the ball cage, a hollow spherical shape of the inner bearing opening and a hollow spherical shape of the outer bearing opening each correspond to a spherical segment, with the inner bearing opening and the outer bearing opening each being in the form of an accommodation opening that is closed around the coupling portion on the proximal side, such that the main shaft extends on the distal side from the wobble plate and the ball cage, is mounted so as to be rotatable about the main axis distally of the wobble plate and is secured in the axial direction.

6. The bearing arrangement as set forth in claim 1, wherein
the coupling portion having the first round grooves, the ball cage having the window openings and having the inner bearing opening, the rolling element balls and the outer bearing opening of the wobble plate having the second round grooves are dimensioned so as to be matched to one another in such a way that the ball cage forms an inner ball joint with the coupling portion and an outer ball joint, concentric with the inner ball joint, with the outer bearing opening of the wobble plate.

7. The bearing arrangement as set forth in claim 6, wherein
a surface of the spherical coupling portion adjacent to the first round grooves and an inner surface of the ball cage adjacent to the window openings form an inner slide bearing, and
a surface of the hollow spherical accommodation opening adjacent to the second round grooves and an outer surface of the ball cage adjacent to the window openings form an outer slide bearing.

8. The bearing arrangement as set forth in claim 6, wherein the coupling portion and the outer bearing opening each have a distal and a proximal bearing portion, the first round grooves, the second round grooves and the ball cage being present in the distal bearing portion, and a surface of the coupling portion comprising an inner slide portion and a surface of the outer bearing opening comprising an outer slide portion, which forms a slide bearing with the inner slide portion, in the proximal bearing portion.

9. The bearing arrangement as set forth in claim 6, wherein
the bearing arrangement comprises secondary rolling balls which are smaller than the rolling bearing balls and, guided by the ball cage, run on a surface of the coupling portion adjacent to the first round grooves on the inside and on a surface of the outer bearing opening adjacent to the second round grooves on the outside.

10. The bearing arrangement as set forth in claim 1, wherein
the outer bearing opening of the wobble plate comprises on the distal side a widening portion matched to the ball cage, and the inner bearing opening of the ball cage comprises on the distal side an opening portion matched to the coupling portion.

11. The bearing arrangement as set forth in claim 1, wherein
the wobble plate and the ball cage are each formed from two or more parts, with at least one joining plane in each case extending through the outer accommodation opening of the wobble plate and the inner accommodation opening of the ball cage.

12. The bearing arrangement as set forth in claim 1, wherein
the window openings, the first round grooves and the second round grooves are uniformly distributed over the circumference, and/or
two of the window openings present opposite one another on the ball cage are in the form of circular window openings, with each remaining window opening being in the form of a slot.

13. The bearing arrangement as set forth in claim 1, wherein
the outer bearing opening is formed in a distal bearing portion of the wobble plate connected on the proximal side to a spherical drive portion, the ball center of which is spaced apart from the pivot center of the wobble plate,
the spherical drive portion being accommodable in a cylindrical sleeve element which is spatially alignable using a drive apparatus.

14. A surgical instrument comprising:
a shaft, a tool at a distal shaft end and a handle at a proximal shaft end, the handle comprising a bearing arrangement having a wobble plate connected in articulated fashion to a main shaft which defines a main axis and pivotable in two directions orthogonal to the main axis about a pivot center which is located on the main axis, the wobble plate being connected to a plurality of steering wires which extend through the shaft along the main axis to a deflection mechanism of the tool, wherein
the bearing arrangement is the bearing arrangement as set forth in claim 1.

15. The surgical instrument as set forth in claim 14, wherein
the wobble plate includes on the proximal side a spherical drive portion, the ball center of which is spaced apart from the pivot center of the wobble plate, the handle comprising a drive apparatus for spatially aligning a cylindrical sleeve element in which the spherical drive portion is accommodated.

* * * * *